United States Patent
Kohli et al.

(10) Patent No.: US 7,054,661 B1
(45) Date of Patent: May 30, 2006

(54) METHOD AND SYSTEM FOR SUPPORTING WIRELESS NETWORK SERVICES IN A NETWORK THROUGH ANOTHER NETWORK HAVING A DIFFERENT NETWORK TECHNOLOGY

(75) Inventors: Pardeep Kohli, Plano, TX (US); Seshagiri R. Madhavapeddy, Richardson, TX (US); Jianming Xu, Plano, TX (US); Ghassan Naim, Garland, TX (US)

(73) Assignee: Alcatel Wireless, Inc., Plano, TX (US)

( * ) Notice: Subject to any disclaimer, the term of this patent is extended or adjusted under 35 U.S.C. 154(b) by 598 days.

(21) Appl. No.: 09/924,785

(22) Filed: Aug. 8, 2001

Related U.S. Application Data

(60) Provisional application No. 60/307,216, filed on Jul. 20, 2001.

(51) Int. Cl.
*H04B 1/38* (2006.01)
*H04M 1/00* (2006.01)

(52) U.S. Cl. .................. 455/560; 455/455; 455/552.1; 455/406; 455/411; 455/899; 370/351; 370/401

(58) Field of Classification Search ................ 455/560, 455/552.1, 445, 701, 406, 409, 411, 899; 370/351, 352, 328, 356, 338, 466, 465, 401
See application file for complete search history.

(56) References Cited

U.S. PATENT DOCUMENTS

| | | | |
|---|---|---|---|
| 5,862,481 A * | 1/1999 | Kulkarni et al. | 455/432.2 |
| 5,933,784 A * | 8/1999 | Gallagher et al. | 455/552.1 |
| 6,697,620 B1 * | 2/2004 | Lamb et al. | 455/432.1 |
| 6,714,799 B1 * | 3/2004 | Park et al. | 455/558 |
| 2002/0006780 A1 * | 1/2002 | Bjelland et al. | 455/406 |

* cited by examiner

*Primary Examiner*—Edan Orgad
*Assistant Examiner*—Shaima Q. Aminzay
(74) *Attorney, Agent, or Firm*—Haynes & Boone, LLP; Bobby D. Slaton; Jessica W. Smith

(57) ABSTRACT

The present invention provides a system and method for migrating a control of a wireless communication service provided to a mobile station (MS) in a first network depending on a first technology to a second network depending on a second technology. When receiving a request for the wireless communication service in the first network by a mobile switch center (MSC), at least one instruction is obtained to grant or deny the wireless communication service from a first control device in the second network, the first control device providing the instruction based on its communication to a management subsystem for the control of the wireless communication service. If the wireless communication service is granted, a second control device in the first network controlled by the first control device allows the MS to execute the wireless communication service with a receiver. If the wireless communication service is denied, the second control device in the first network controlled by the first control device prohibits the MS to execute the wireless communication service with the receiver, wherein the first and second control device communicate with each other using a predetermined protocol independent of the network technology used by either the first and the second network, and wherein the first network thus maintains the control of the wireless communication service through the management subsystem connected to the second network without implementing additional management subsystem.

4 Claims, 8 Drawing Sheets

METHOD AND SYSTEM FOR SUPPORTING WIRELESS NETWORK SERVICES IN A NETWORK THROUGH ANOTHER NETWORK HAVING A DIFFERENT NETWORK TECHNOLOGY

CROSS REFERENCE

The present invention claims the benefits of U.S. Provisional Patent Application Ser. No. 60/307,216, which was filed on Jul. 20, 2001 and entitled "A METHOD AND ARCHITECTURE FOR PROVIDING NETWORK TECHNOLOGY INDEPENDENT WIRELESS SERVICES MIGRATION."

BACKGROUND OF THE INVENTION

The present invention relates generally to voice and data communications, and more particularly, to a wireless system and method for providing communication services to a wireless mobile user of a network through another network using a different network technology.

With the ever-evolving technology in the wireless industry, new wireless generations are being standardized to provide a new and broader set of wireless services to end users. With this natural evolution, new network architectures and technologies are defined and deployed in the market, which leads to a coexistence of multiple wireless networks built on multiple technologies, with some having the capability to support more services than others. In general, older networks may evolve but seldom are able to provide the same features or support the same capacity as newer networks.

While operating both an older network and a newer network, one of the concerns for a network operator is how to continue managing some existing services based on the older network technology in the newer network which may use different rules and protocols.

Taking a wireless Prepaid Service as an example, each subscriber of the Prepaid Service is assigned a record in a network database system which includes a unique account number and an associated prepaid monetary value. The record is maintained and updated based on the user services usage and requests for monetary increases.

FIG. 1 illustrates a simplified schematic of a current solution for providing the Prepaid Service in two communication networks of two different generations of network technologies. The two independent networks in the example are an IS41 Inetwork 10 and a GSM/UMTS network 12, each having a separate service system for providing the Prepaid Service. For the IS41 network 10, a full blown intranet based billing subsystem 14 is established to communicate with a Signaling Control Point (SCP) 16 of the network 10 for handling calls made or received by subscribers of the IS41 network 10 (e.g., calls made from the IS41 network to the Public Switch Telephone Network (PSTN) 18). For the GSM network 12, another dedicated SCP 20 is installed to communicate with another billing subsystem 22 for calls made by subscribers of the Prepaid Service using the GSM network 12. In order to accommodate both technologies (IS41 and GSM in this case), each network has to have an SCP and a billing system, which will cause a wireless service provider higher operational costs and longer service deployment time.

Another disadvantage of such a solution is that the network architecture shown above does not provide high scalability. That is, for each additional network maintained by the wireless service provider, an additional SCP and billing system must be installed, thereby increasing operational and deployment costs with future network expansions.

What is needed is a method and system that allows seamless service migration from one network technology to another. The solution must be cost effective due to the large investment that service providers have put into existing networks, and should provide high scalability to the networks so that future capacity increases can easily be supported. In addition, there should be no degradation in the quality and reliability of the services provided to the subscribers and should require very little change to the existing networks and their contained network entities.

SUMMARY OF THE INVENTION

In response to these and other needs, a new and improved system and method provide communication services to a wireless mobile user of a network through another network using a different network technology. Effectively, the system and method interconnect a wireless user from one network type to another. The present disclosure further provides a method and system to provide new services to a mobile user from a different network where a mobile station used by the user may not support such services. The present disclosure also provides a method for controlling the operation of network entities that play a part in the provisioning of different services provided to a mobile station.

In one example of the present invention, a system and method is provided for migrating a control of a wireless communication service provided to a mobile station (MS) in a first network depending on a first technology, to a second network depending on a second technology. When receiving a request for the wireless communication service in the first network by a mobile switch center (MSC), at least one instruction is obtained to grant or deny the wireless communication service from a first control device in the second network. The first control device provides the instruction based on its communication to a management subsystem for the control of the wireless communication service. If the wireless communication service is granted, a second control device in the first network controlled by the first control device allows the MS to execute the wireless communication service with a receiver. If the wireless communication service is denied, the second control device in the first network controlled by the first control device prohibits the MS to execute the wireless communication service with the receiver. The first and second control device can communicate with each other using a predetermined protocol independent of the network technology used by either the first and the second network, and the first network can maintain the control of the wireless communication service through the management subsystem connected to the second network without implementing additional management subsystem.

DESCRIPTION OF THE PREFERRED EMBODIMENT

For the purposes of illustrating the present invention, various acronyms are used, and the definitions of which are listed below:
ANSI41 American National Standards Institute—Cellular Radio Telecommunications Intersystem Operations
BSS Base Station System
CAP CAMEL Application Part
GMSC Gateway MSC
GSM Global System for Mobile communications
HLR Home Location Register
IGS Intelligent Gateway Service
IS41 Wireless Network conforming to the IS41 standard
ISDN Integrated Services Digital Network
ISUP ISDN User Part (of SS7)
IVRU Interactive Voice Response Unit
MC Messaging Centre
MEGACO Media Gateway Control protocol
MSC Mobile Switching Centre
PIN Personal Identification Number
PSTN Public Switch Telephone Network
SCP Signalling Control Point
SMSC Short Message Service Centre
SMTP Simple Mail Transfer Protocol
SS7 Signaling System No.7
T1 Digital communication line that uses time division multiplexing with an overall transmission rate of 1.544 million bits per second.
TCP/IP Transmission Control Protocol/Internet Protocol
UMTS Universal Mobile Telecommunications System
WMG Wireless Media Gateway
IWSS Wireless Soft Switch The present invention is described below with several examples. It is understood, however, that the examples are not necessarily limitations to the present invention, but are used to describe typical embodiments of operation. For instance, although an IS41 and GSM networks are used to describe the present invention, the invention can apply to many different wireless networks. Additionally, although two networks, and a Prepaid Service are used, the present invention can be applied to more than two networks and to any other wireless network services if such services of a network are not otherwise prohibited.

Figure 1:
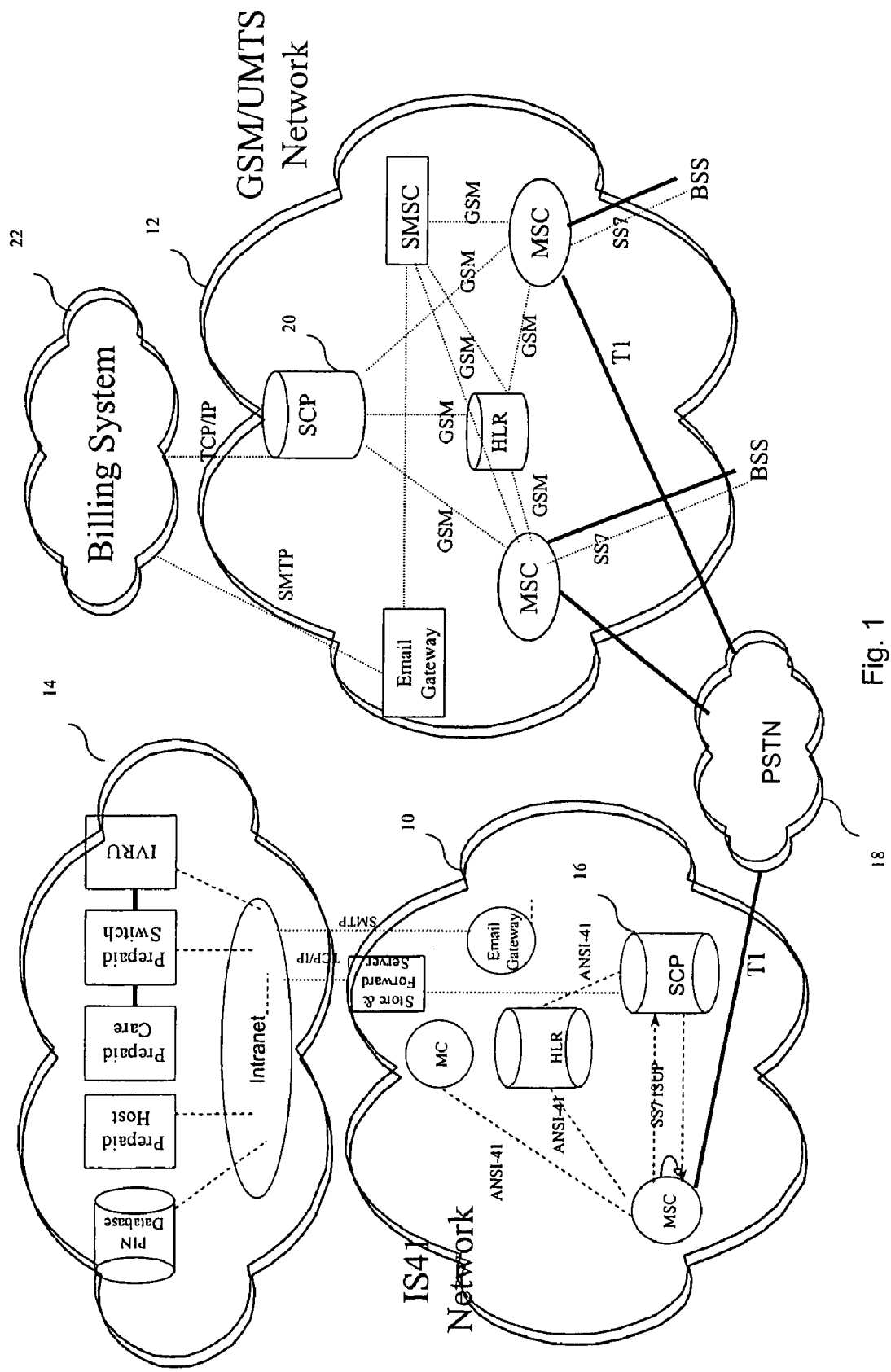
FIG. 1 illustrates a conventional network architecture for providing a wireless network service such as a Prepaid Service in both the IS41 and GSM/UMTS networks.
Figure 2:
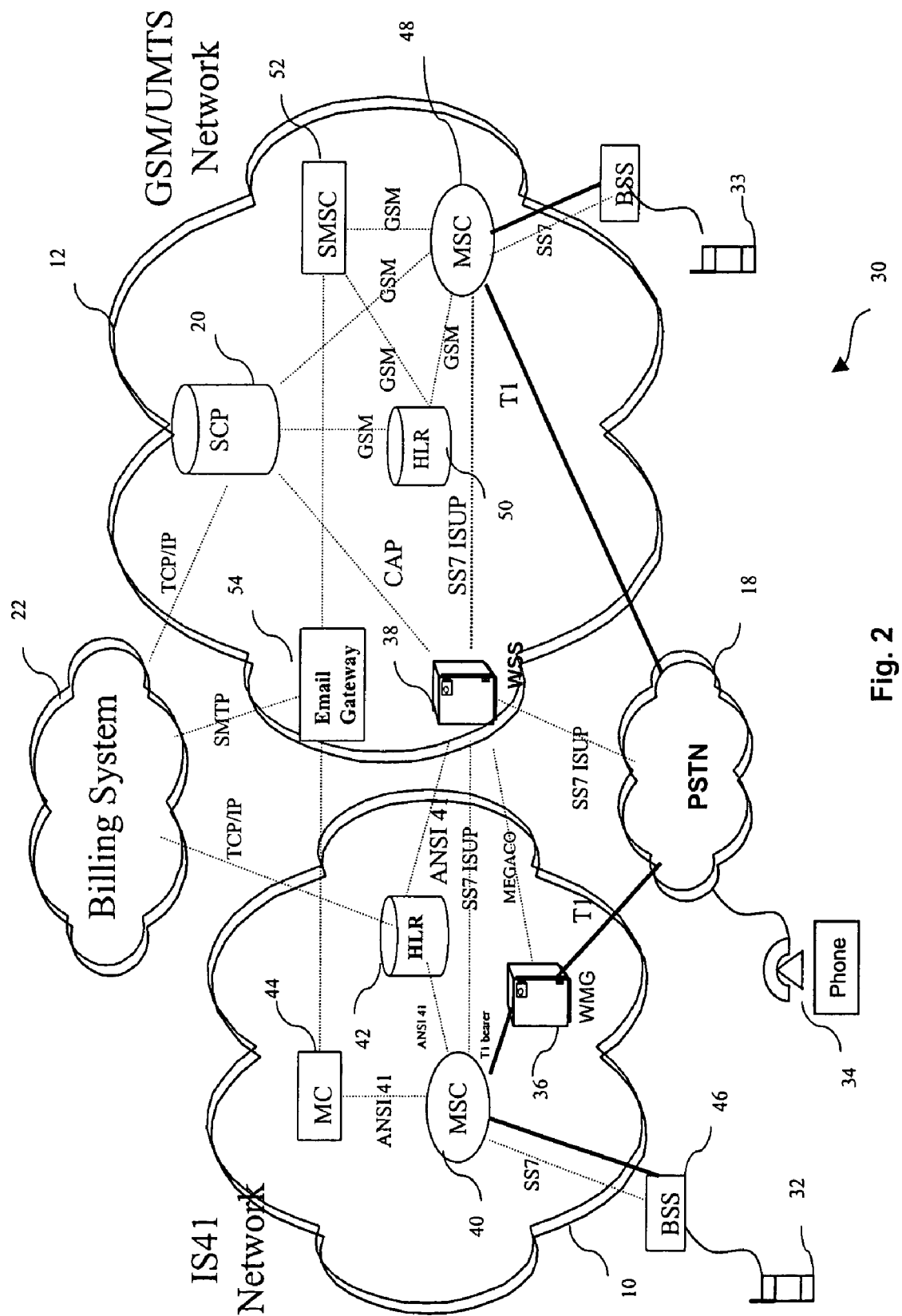
FIG. 2 illustrates a network architecture for providing the wireless network service such as a Prepaid Service in the IS41 network through the GSM/UMTS network according to one example of the present invention.

FIG. 2 illustrates a multi-network communication system 30 for supporting a Prepaid Service of one network through another according to one example of the present invention. Similar to FIG. 1, there are two different types of wireless communication networks involved: an IS41 network 10 and a GSM/UMTS network 12. Assuming a service management subsystem such as a billing subsystem 22 is connected to an SCP 20 of the GSM network 12 through a TCP/IP protocol, the billing subsystem 22 is expected to support any calls for a mobile station (MS) 32 operating in the IS41 network 10 as well as MSs operating in the GSM/UMTS network 12. For example, a call can be made between the two networks, two subscribers in the same network, or between either network and a receiver 34 in the PSTN 18. It is understood that the SCP can also be deemed as either as a part of the GSM network 12 or a part of the service management subsystem such as the billing subsystem 22 since the primary function of the SCP is to communicate with a network entity in the network using an appropriate protocol.

The user of the MS 32 is a subscriber of the Prepaid Service, and her wireless communication service within the IS41 network 10 is provided contingent on the status of a personal account in the billing subsystem 22 in which she has paid an amount of money. Her use of the MS 32 will consume the amount of money in the account, and the billing subsystem 22 should keep her account updated in the fastest and most effective fashion since her wireless communication service will be provided only if there is enough fund in her account. It is understood that the IS41 network 10 is considered to be an older network than the GSM network 12 (or, the GSM network uses a newer network technology), and when the network operator of the IS41 network 10 adopts the new GSM network 12 without abandoning the IS41 network, it would be desirable for the service operator to provide wireless network services such as the Prepaid Service not only to the mobile users of the GSM network, but also to the mobile users of the old IS41 network as well. In order to avoid redundant equipment investment, it is extremely desirable for the network operator to avoid the network design as shown in FIG. 1 wherein multiple SCPs and multiple billing subsystems have to be used.

One example of the present invention as illustrated in FIG. 2 avoids using excessive equipment by implementing a multi-network communication system 30 for supporting the Prepaid Service for mobile users of both the IS41 network and the GSM network. In this example, in order to "migrate" the wireless service from the IS41 network 10 to the GSM network 12, a WMG 36 and wireless switch device such as a WSS 38 are used to interconnect the IS41 and GSM networks, thereby providing a seamless Prepaid Service to subscribers in both networks.

The WSS 38 handles calls and exchanges call information with the MSC 40, the SCP 20, and the WMG 36. The WMG 36 is responsible for transferring application data information between the MS 32 and any other receiver end such as a PSTN receiver, another MS in the GSM network, or another MS in the IS41 network. The WSS 38 controls the WMG 36 operation using various control messages. The communications between the WMG 36 and the WSS 38 may conform to a media gateway control protocol such as MEGACO.

The WMG 36 is connected to one or more MSCs 40 in the IS41 network 10 using communication links such as T1 links. The WMG 36 is also connected to the PSTN network via another communication link such as another T1 link. The MSC 40 connects to an HLR 42 and an MC 44 in the IS41 network 10, as well as a BSS 46 using SS7 protocol. The HLR 42 also communicates with the WSS 38 in the GSM network 12 using the ANSI 41 standard protocol. Moreover, the MSC 40 further communicates to the WSS 38 using SS7 ISUP as the signaling protocol. Therefore, from the perspective of the IS41 Network, multiple network entities are in contact with the WSS 38, and each uses a different protocol.

In order to communicate with multiple network entities in both the IS41 network and the GSM network, the WSS 38 has multiple interfaces built in that communicate with them using multiple protocols. For example, it uses a dedicated MEGACO interface to control the connection setups of the WMG 36 in the IS41 network. The WSS 38 communicates with the HLR 42 in the IS41 network using an ANSI-41 interface. The WSS 38 has a connection with the SCP 20 of the GSM/UMTS network 12 which uses CAP as the communication protocol. Additionally, the WSS 38 has an SS7 ISUP interface to communicate with one or more MSC 48 in the GSM/UMTS network as well as one or more MSCs in the IS41 network 10. Moreover, the WSS 38 is connected with the PSTN 34 using the SS7 ISUP as the signaling protocol. The MSC 48 in the GSM network 12 further connects to the SCP 20, an HLR 50, and an SMSC 52 through GSM connections. In order to process information for the Prepaid Service, the SCP 20 in the GSM/UMTS network 12 is connected to the billing subsystem 22. There may also be an Email Gateway 54 that links the MC 44 of the IS41 network 10 and the SMSC 52 of the GSM network 12, and further connected to the billing subsystem 22. Compared to the network in FIG. 1, the same Email Gateway 54 is used for both networks.

From operational perspective, when the MS 32 located in the IS41 network 10 makes a call to a PSTN number which represents a receiver 34, its call request is routed from the BSS 46 to the MSC 40 in the IS41 network 10, and further to the WSS 38 in the GSM/UMTS network. The WSS 38 then passes the control of the call to the SCP 20, which can check the corresponding subscriber account in the billing subsystem 22 to allow or deny the call to go through. More details are explained below with regard to FIGS. 3–5. If it is a GSM subscriber located in the GSM network 12 who makes a call to the PSTN receiver 34, its call request is first sent to the MSC 48 in the GSM/UMTS network 12, and the call control is then passed to the SCP 20 directly. Similar to the call initiated from the IS41 network, the SCP 20 then examines the monetary value in the subscriber account of the billing subsystem 22. With this configuration, the SCP 20 can therefore request the MSC 48 to refuse or disconnect the call if or when the subscriber's prepaid monetary value becomes insufficient for the requested service. It is understood that the same routes can be reversed for processing calls initiated by a user of the PSTN to a user of either the IS41 network 10 or the GSM network 12.

Figure 3:
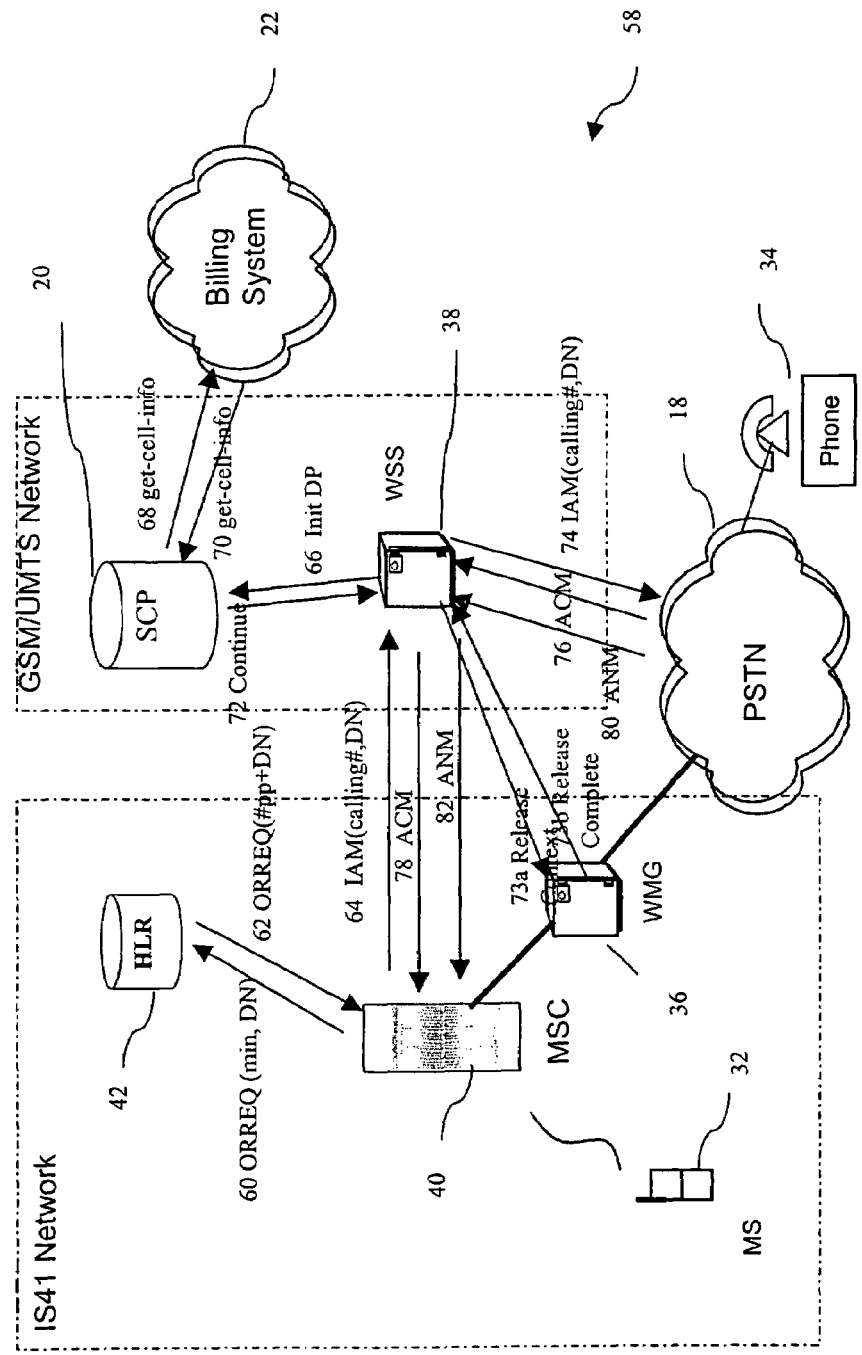
FIGS. 3–5 illustrate call flow diagrams for providing the Prepaid Service from the GSM/UMTS network, while the request of the service is received by the IS41 network according to the example of the present invention as illustrated in FIG. 2.

FIG. 3 illustrates a call flow diagram 58 for steps taken to set up a call initiated by an MS according to one example of the present invention. When the MS 32 makes a call request, which reaches the MSC 40, the MSC 40 sends an ORREQ message to the HLR 42 in step 60 to pass on the mobile user identification information and authenticate the mobile user service request, the HLR 42 sends to the MSC 40 a ORREQ response message in step 62 approving the call origination request and informing the MSC 40 about the mobile user profile. The MSC 42 then communicates with the WSS 38 in an Initial Address Message (IAM) passing on the destination number and calling number of the MS 32 (step 64). The WSS 38 then sends a request to the SCP 20 with the mobile user information in step 66, while the SCP contacts the billing subsystem 22 requesting credit information of the corresponding account for the user of the MS 32 (step 68). The billing subsystem 22 then replies with the user credit information (step 70). The SCP 20 examines the user's current credit amount, and if sufficient funds exist in the user's account, sends a message to the WSS 38 requesting it to continue the service call setup (step 72). Once the WSS and WMG have collectively established a context for a connection route between the MSC 40 and the PSTN 18 by sending messages between them (step 73a and 73b), the WSS 38 immediately sends out an IAM to the PSTN 18 to access the receiver 34 (step 74). The PSTN sends an ACM message to the WSS 38 (step 76) indicating that the receiver 34 has been successfully accessed and is ringing. The WSS 38 sends a similar ACM message to the MSC 40 indicating that the connection with the receiver has been established. Thereafter, upon receiving an ANswer Message (ANM) from the PSTN indicating that the call made to the receiver 34 has been answered (step 80), the WSS 38 sends a similar ANM to the MSC 40 (step 82). At this moment, a call originated from a user of the IS41 network subscribing to the Prepaid Service has been set up to go through to reach the receiver 34 in the PSTN 18.

It is noted that if in step 70 the billing subsystem 22 indicates that there is a lack of fund to proceed, the SCP 20 would inform the WSS 38 to stop connecting the call to the receiver 34, the WSS 38 then interfaces with the MSC 40 indicating the same, and the call request of the MS 32 would be turned down.

Figure 4:
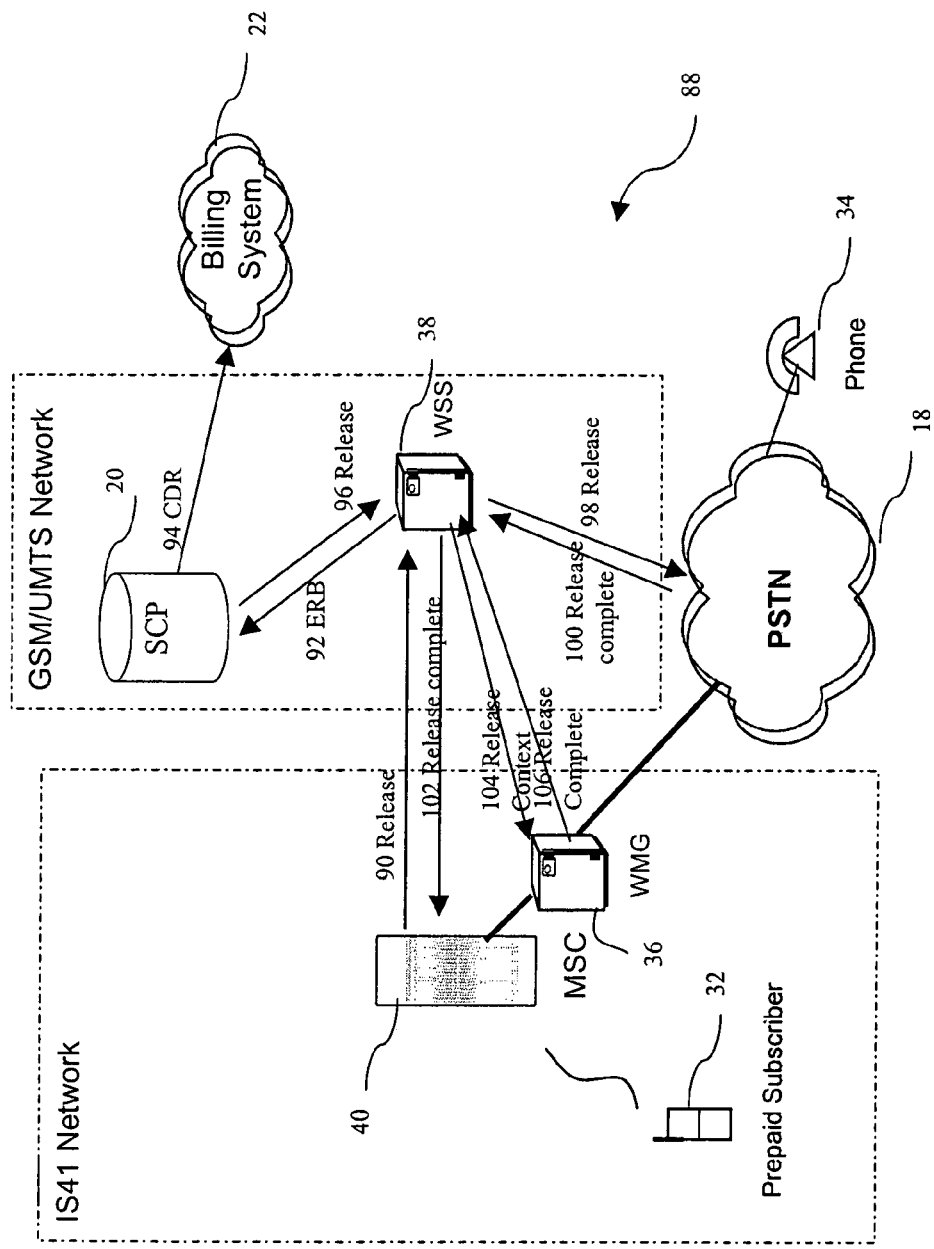

FIG. 4 illustrates a call flow diagram 88 for steps taken to tear down the call initiated by an MS as illustrated in FIG. 3. When the MS 32 terminates the call, the MSC 40 informs the WSS 38 to release the occupied bandwidth for processing the call (step 90). The WSS 38 then sends a call termination indication to the SCP 20 (step 94), and the SCP 20 further initiates a Credit Deposit Record message (step 94) to the billing subsystem 22 to update the account status of the user of the MS 32. Once the record is updated in the billing system, the SCP 20 informs the WSS 38 to release the call between the MS32 and the receiver 34 through the PSTN 18 (step 96). The WSS 38 informs the PSTN 18 to release all the bandwidth and circuits allocated for the call between the end receiver 34 and the WMG 36 in step 98, and the PSTN 18 confirms the completion of the releases in step 100. The WSS 38 further inform the MSC 40 that the resource release on the PSTN side has been done (step 102), and further informs the WMG 36 to release the context of the call and terminate any dealing with the PSTN 18 for the call (step 104). Once it is achieve, the WMG 36 confirms it with the WSS 38 with a message in step 106.

Figure 5:
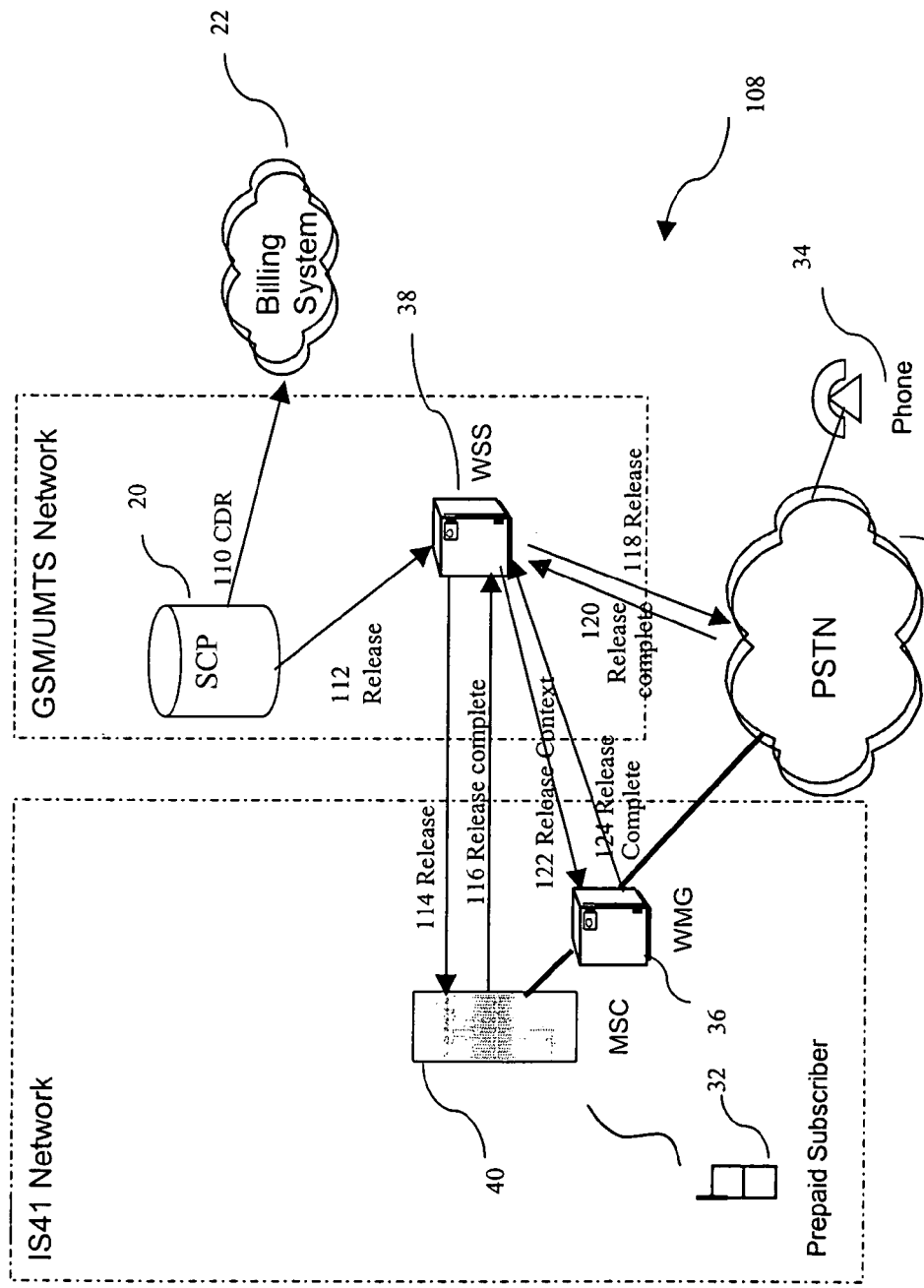

During the call, the SCP 20 monitors the MS call duration and compares it with the monetary value in the user account that has been extracted from the billing subsystem 22 during the call setup procedure in FIG. 3 (step 70). If at any moment before the end of the call that the prepaid monetary value becomes insufficient, the SCP 20 can request the WSS 38 to refuse or disconnect the call. FIG. 5 illustrates a detailed call flow diagram 108 for terminating a call when there is a lack of fund in the prepaid account according to one example of the present invention. When the SCP 20 detects that there is a lack of sufficient fund in the billing subsystem 22, it sends the CDR message to the billing subsystem in step 110 in order to update the billing record information in the billing subsystem 22, and informs the WSS 38 to terminate the call in step 112. Steps 114–124 execute the termination process in the same way as the steps 90–106 of FIG. 4 except that the release command is initiated by the WSS 38 instead of the MSC 40.

Figure 6:
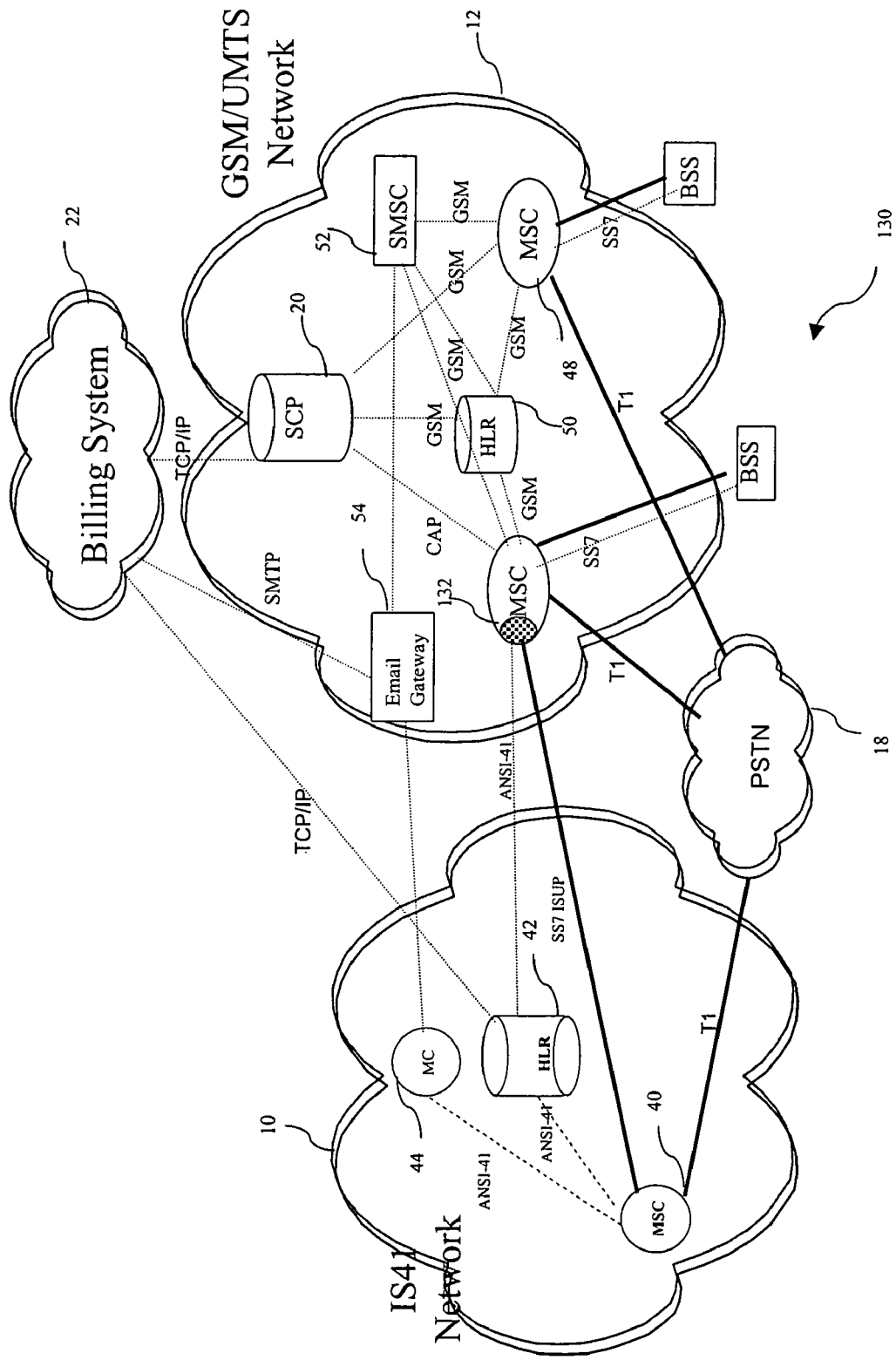
FIG. 6 illustrates another network architecture for providing the wireless network service such as a Prepaid Service in the IS41 network through the GSM/UMTS network according to another example of the present invention.

FIG. 6 illustrates a multi-network communication system 130 for supporting a Prepaid Service of one network through another according to another example of the present invention. In this configuration, an MSC 132 replaces the WSS 38 in FIG. 2 to assist with migrating the Prepaid Service to the new GSM network 12. The MSC 132 connects to the HLR 50, the SCP 20, and the SMSC 52 inside the GSM network 12. On the other side, the MSC 132 has an interface that communicates with the HLR 42 and the MSC 40 of the IS41 network. Similar communications as those described with regard to FIGS. 3–5 can be made except that the MSC 40 interfaces with the MSC 132 directly without the assistance of the WMG 36 and the WSS 38.

Figure 7:
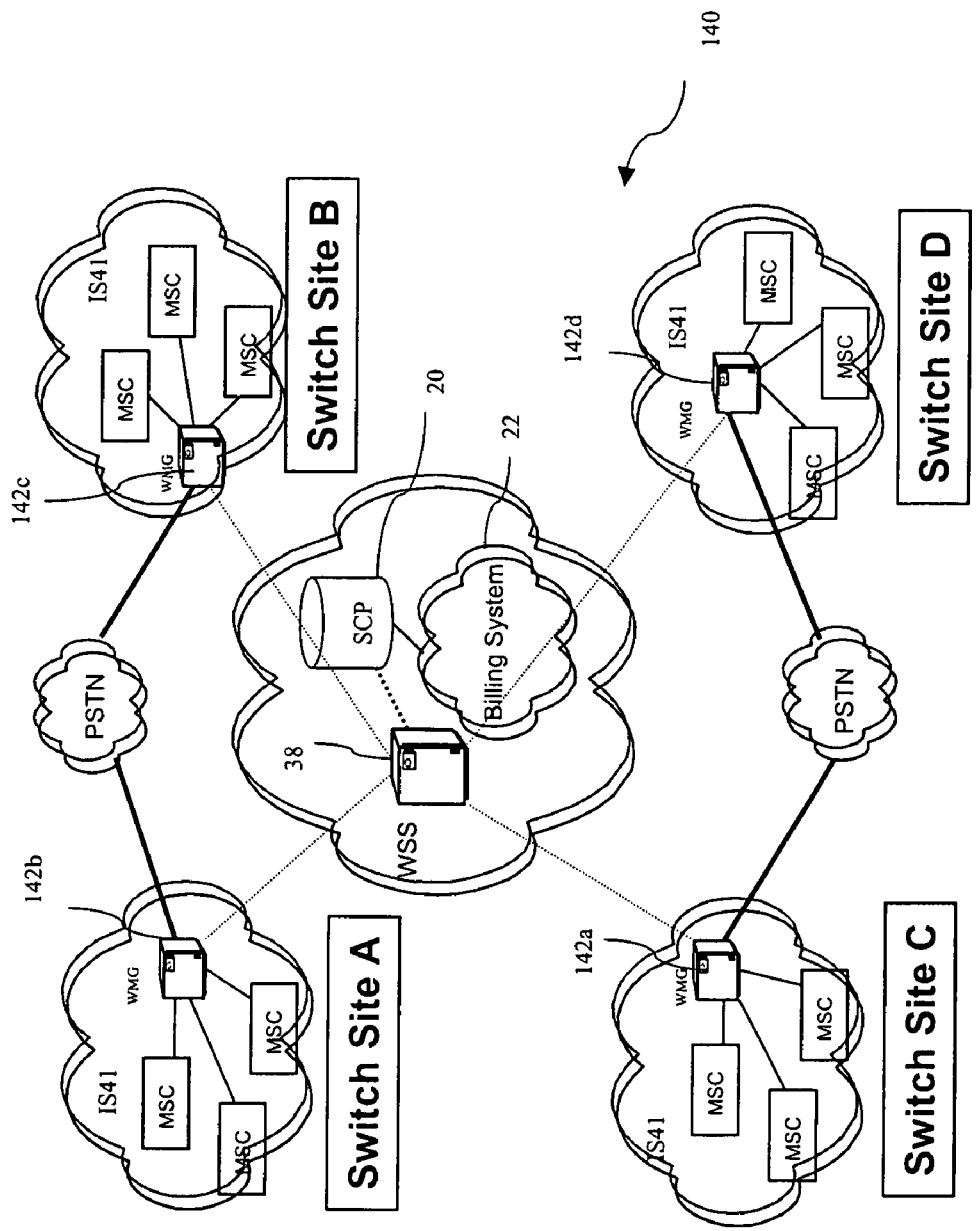
FIG. 7 illustrates a network configuration for supporting the wireless network service of multiple IS41 networks from a GSM/UMTS network according to one example of the present invention.

FIG. 7 illustrates another multi-network communication system 140 for supporting a Prepaid Service of one network through another according to yet another example of the present invention. In this configuration, the WSS 38 of the GSM network handles multiple WMGs 142a–142d for supporting the Prepaid Service. It does not matter whether a call comes in from which switch site (e.g., Switch Site A–D), the WMG in that receiving switch site communicates with the WSS 38 and thus receives instructions from the billing subsystem 22 through the SCP 20. Having one WSS support multiple WMGs in different sites is a very scalable solution since additional WMGs can be easily added if there are more mobile users. Henceforth, the network operator can maximize its benefits with minimum equipment investment when two or more network technologies are supporting two different wireless communication networks.

Figure 8:
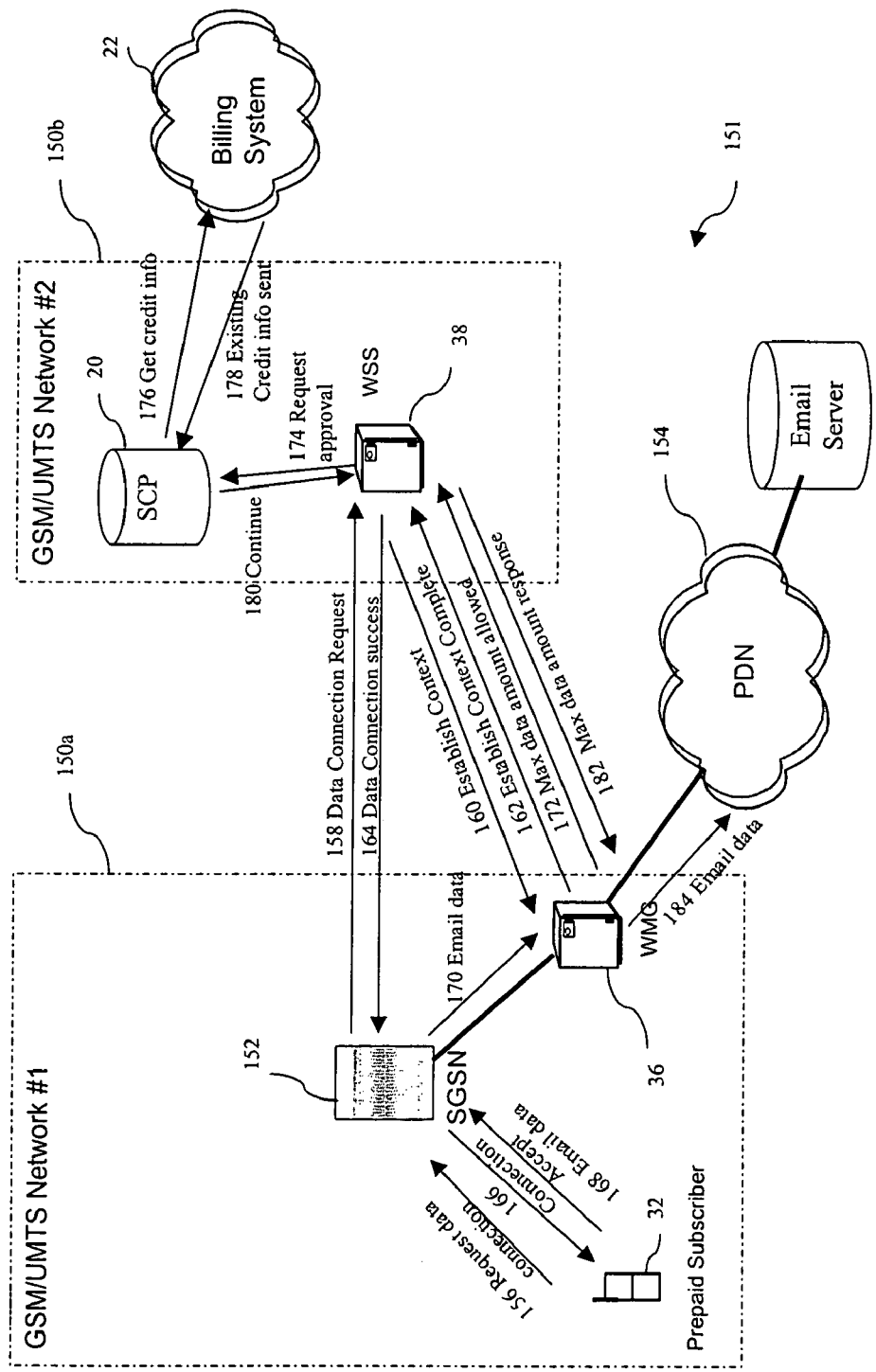
FIG. 8 illustrates a multi-network communication system for supporting a data service of one network through another network according to one example of the present invention.

FIG. 8 illustrates a multi-network communication system 151 for supporting a data service of one network through another network according to one example of the present invention. The present invention as described above with regard to FIGS. 2–7 focuses on the wireless network services such as the Prepaid Service working in conjunction with wireless communication services such as the voice service provided by the two different networks. Similar concepts can be applied to the entities in the two different networks to provide data services to users of both networks.

Referring to FIG. 8, the steps shown are for setting up a call initiated by an MS for an email service. Although the two networks 150a–b depicted are assumed to be all GSM/UMTS networks, it is understood that any network that provides email service can be similarly supported. For email communications, when an SGSN 152 receives a data connection request from the MS 32 in step 156, the SGSN 152 communicates with the WSS 38 by sending a connection request message to it in step 158. At this stage of the call, the application that is used by the MS is unknown. The WSS 38 sends a message to the WMG 36 in step 160 to establish a context connection between the SGSN 152 and the PDN 154. If the context creation is successful, the WMG 36 sends a confirmation message in step 162 to the WSS 38 which further informs the SGSN 152 that the data connection establishment is complete (step 164). The SGSN 152 then informs the MS 32 that its request has been accepted (step 166), and that it can start transmitting and receiving packet data. The MS 32 therefore starts sending email data to the WMG 36 through the SGSN 152 (step 168 and 170). Before allowing the data to go through, the WMG 36 requests the WSS 38 for the maximum amount of data that the user is allowed to transmit (step 172). Upon receiving this request, the WSS 38 sends a request to the SCP 20 in step 174 with the mobile user information, while the SCP 20 contacts the billing subsystem 22 in step 176 requesting credit information of the corresponding account for the user of the MS 32. The billing subsystem 22 then replies with the MS 32 credit information in step 178. The SCP 20 examines the user current credit amount and, if sufficient fund exists in the user account, sends a message to the WSS 38 requesting it to continue the call and informs it the amount of data the user is allowed to transmit (step 180). Subsequently in step 182, the WSS 38 informs the WMG 36 of the maximum data allowed. Then in step 184, the WMG 36 allows the data to go through and monitors the total amount transmitted from the MS, and informs the WSS when the total amount transmitted by the MS exceeds the allowed amount.

The above disclosure provides many different embodiments, or examples, for implementing the invention. However, specific examples, and processes are described to help clarify the invention. These are, of course, merely examples and are not intended to limit the invention from that described in the claims. For instance, in the example illustrated above, although one SCP is deemed to exist in one of the networks, it is understood that the network can easily contain several SCPs to handle a much larger number of subscribers.

For simplicity purposes, the example illustrated above provides that the GSM/UMTS network is the network that supports the SCP directly, it is understood that the SCP can also be located in the IS41 network. In that case, subscribers in the GSM/UMTS network access the prepaid services available in the IS41 network using the WSS and WMG inter-network connections. Consistent with this understanding, a wireless communication service does not need to be initiated by a user of the IS41 network, it can be one user of the GSM network. And similarly, the recipient of a call does not need to be a subscriber of the PSTN like the call receiver 34. The recipient can be a user in the same network where the call is initiated, or can be a user of another network such as the GSM network (while the call is initiated in the IS41 network).

Referring back to FIG. 2, assuming in this scenario a user 33 of the GSM network actually initiates a call, the user 33 of the GSM network communicates with its own MSC 48, and if the billing subsystem is connected to the GSM network 12 through the SCP 20 and the recipient is one in the PSTN 18 such as the receiver 34, then the control can be directly asserted by the MSC 48 since it is capable to manage the requested wireless communication service by constantly communicating with the billing subsystem 22. However, if the recipient is the user in the IS41 network such as the user 32, then the WSS 38 and WMG 36 participate in the control of the Prepaid Service. Collectively, the MSC 48 for the caller, the SCP 20, the billing subsystem 22, the WSS 38, the WMG 36, the MSC 40 for the recipient may manage the control of the wireless communication service provided to the user 33 based on his/her subscribed Prepaid Service. In this situation, a typical communication connection route is from the user 33, to the MSC 48, the PSTN 18, the WMG 36, the MSC 40, and finally to the user (i.e., his MS) 32 of the IS41 network. If the billing subsystem is connected to the IS41 network, then a "mirror image" of the configuration of FIG. 2 will be implemented wherein the WSS 38 and SCP 20 will be in the IS41 network, and the WMG 36 will be in the GSM network.

The present invention as described above thus provides an economical method and system for supporting a wireless network service offered from one wireless network through another network having a different network technology. The present invention does not introduce any change to the existing architectures in the interconnected wireless networks. This is a significant advantage for a network operator or service provider given that there is no need for investing in upgrading existing equipment, and the migration of the services to be supported by the new network can be achieved in much shorter time and at a lower cost. In some cases, to further save the costs for the network operator, the WMG and WSS can be reused as GMSC and Tandem switch. In addition, the present invention provides a maximum leverage of equipment investment since the configured networks are highly scalable and have a high reliability factor.

The present invention also introduces cost savings by eliminating loop-back trunks existed in each MSC in the IS41 network due to the fact that each MSC now has a direct connection with the WMG and WSS. Moreover, because of the intelligence of the WMG and WSS, the present invention allows the delivery of additional network services such as "in-call warning announcement" in the Prepaid Service to warn the user that his fund has been depleted to a predetermined threshold, and that he better finishes his call as soon as possible.

The WMG and WSS pair also allow new services to wireless networks of older generations by providing network services such as call forwarding, mobile number portability, home zone services, and location based services, while traditionally, these services cannot be offered in an older IS41 network.

It will also be understood by those having skill in the art that one or more (including all) of the elements/steps of the present invention may be implemented using software and hardware to develop WSS and WMG nodes, which will then be deployed in a wireless network at appropriate locations with the proper connections.

Furthermore, while the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A system for providing a prepaid service in a multi-network communication system, comprising:
   a first wireless communication network operating according to a first protocol;
   a second wireless communication network operating according to a second protocol;
   a prepaid service subsystem for supporting prepaid service to mobile users of both the first wireless communication network and the second wireless communication network, wherein request for prepaid service from any of the mobile users is directed to the prepaid service subsystem through the second wireless communication network;
   the prepaid service system is in communication with the second wireless communication network and with the first wireless communication network via the second wireless communication network, wherein a request for prepaid service from a mobile user of the first wireless communication network is directed to a signaling control point (SCP) associated with the second wireless communication network which communicates with the prepaid service subsystem for determination of prepaid status of the mobile user; and
   the second wireless communication network further including a switch controller for controlling connection routing for communications associated with mobile users of the first wireless communication network which have been authorized by the prepaid service subsystem.

2. The system of claim 1, wherein the first wireless communication network is a cellular system and the second wireless communication network is a Global System for Mobile Communication system.

3. The system of claim 1, wherein connection routing includes call set-up between an originating mobile user of the first wireless communication network and a call destination.

4. The system of claim 1 further including a third wireless communication network operating according to one of the first protocol, the second protocol, and a third protocol, wherein a request for prepaid service from a mobile user of the third wireless communication network is also directed to the SCP associated with the second wireless communication network.

* * * * *